US00RE34788E

United States Patent [19]

DuRand, III et al.

[11] E Patent Number: Re. 34,788

[45] Reissued Date of Patent: Nov. 15, 1994

[54] PRESSURE CHANGE INTRUSION DETECTOR

[75] Inventors: Elden E. DuRand, III, Crestwood; William K. Logsdon, Louisville, both of Ky.

[73] Assignee: Blue Grass Electronics, Inc., LaGrange, Ky.

[21] Appl. No.: 885,497

[22] Filed: May 19, 1992

Related U.S. Patent Documents

Reissue of:

[64] Patent No.: 4,928,085
Issued: May 22, 1990
Appl. No.: 359,045
Filed: May 30, 1989

U.S. Applications:

[63] Continuation of Ser. No. 469,089, Feb. 23, 1983, abandoned.

[51] Int. Cl.[5] ..... G08B 13/16

[52] U.S. Cl. ..... 340/550; 340/522; 340/544; 340/565; 340/566

[58] Field of Search ..... 340/550, 544, 565, 566, 340/522

[56] References Cited

U.S. PATENT DOCUMENTS

| | | | |
|---|---|---|---|
| 3,573,817 | 4/1971 | Akers | 340/566 |
| 3,914,755 | 10/1975 | Hook | 340/544 |
| 3,990,069 | 11/1976 | Schuman | 340/544 |
| 4,023,156 | 5/1977 | Galvin | 340/550 |
| 4,134,109 | 1/1979 | McCormick et al. | 340/550 |
| 4,223,304 | 9/1980 | Barowitz et al. | 340/566 |
| 4,306,228 | 12/1981 | Meyer | 340/565 |
| 4,333,093 | 6/1982 | Raber et al. | 340/528 |

FOREIGN PATENT DOCUMENTS

| | | | |
|---|---|---|---|
| 942848 | 11/1963 | United Kingdom | 340/566 |

*Primary Examiner*—Glen R. Swann, III
*Attorney, Agent, or Firm*—Middleton & Reutlinger

[57] ABSTRACT

Apparatus utilizing change in pressure condition in an area to be protected to indicate intrusion or change in conditions of the area by using a pressure detection device to detect pressure waves at low and infrasonic frequencies which includes a pressure transducer sensitive to change in pressure to provide an output signal. In some instances an amplifier is provided to amplify the output signal, a signal conditioning circuit is provided to delay a portion of the signal, and a detector device is provided to detect the signal with a comparator provided to compare the signal with the delayed signal and actuate an alarm.

*Additionally, a device producing signals responsive to pressure waves and selected sonic frequencies is taught. If the signals are coincidently received at a coincidence detector, an alarm is activated. Further, the signals can be stretched and/or delayed before receipt at the coincidence detector.*

20 Claims, 4 Drawing Sheets

PRESSURE CHANGE INTRUSION DETECTOR

Matter enclosed in heavy brackets [ ] appears in the original patent but forms no part of this reissue specification; matter printed in italics indicates the additions made by reissue.

This application is a *reissue application for U.S. Pat. No. 4,928,085, issued on May 22, 1990, from application Ser. No. 359,045, filed May 30, 1989, which was a* continuation of application Ser. No. 469,089, filed February 23, 1983, now abandoned.

BACKGROUND OF THE INVENTION

The present invention relates to method and apparatus which is particularly useful in connection with the detection of intrusion into a space to be protected and is particularly useful in detecting, for example, the opening of a window, the breaking of a window or even a sudden impact on the walls of the area.

Heretofore, intrusion detection has been accomplished primarily by means of audio detectors which detect the occurrence of a sound. In more sophisticated form the detectors can be tuned to detect sounds at specific frequencies such as the frequency of the sound made by the breaking of a pane of glass, the slamming of a door or other occurrences. The difficulty with audio discriminator detectors is that in general, there are other occurrences which generate sounds in the same frequency as the frequency generated by the occurrence to be detected thus leading to false trips and false alarms.

Infrared detectors are sometimes utilized as intrusion detectors but do not detect the occurrence surrounding the intrusion, such as the breaking of glass or the opening of a door nor do they detect the events which can occasion the generation of a low frequency pressure wave.

No prior art device is known utilizing a change in pressure as indicated by the occurrence of a low frequency pressure wave in the area to be protected as the basis for the detection of the selected occurrence involving change in the physical characteristics of the area to be protected. Furthermore no prior art devices are known wherein a pressure transducer is utilized to detect the occurrence of a low frequency pressure wave in an area to be detected accompanied by a specific sound occurrence such as the breaking of glass, etc.

SUMMARY OF THE INVENTION

The present invention relates to intrusion detection devices and more particularly to detection devices actuated by the occurrence of a low frequency pressure wave which has been unexpectedly found to accompany even the slightest intrusion and has further been found to be extremely accurate in detecting the occurrences.

More particularly, the present invention provides an apparatus utilizing change in pressure condition in an area to be protected to indicate intrusion or change in conditions of the area by means of a pressure detection device to detect pressure waves at low and infrasonic frequencies which includes a pressure transducer sensitive to change in pressure to provide an output signal. In some instances an amplifier is provided to amplify the output signal, a signal conditioning circuit is provided to delay a portion of the signal, and a detector device is provided to detect the signal with a comparator provided to compare the signal with the delayed signal and actuate an alarm.

Examples in accordance with the present invention are shown in the accompanying illustrations and described herein but it will be understood that the examples presented are by way of illustration only and are not in any way intended to limit the scope of the present invention.

BRIEF DESCRIPTION OF THE DRAWINGS

Examples in accordance with the present invention are illustrated in the accompanying figures wherein.

DETAILED DESCRIPTION OF THE DRAWINGS

Figure 1:
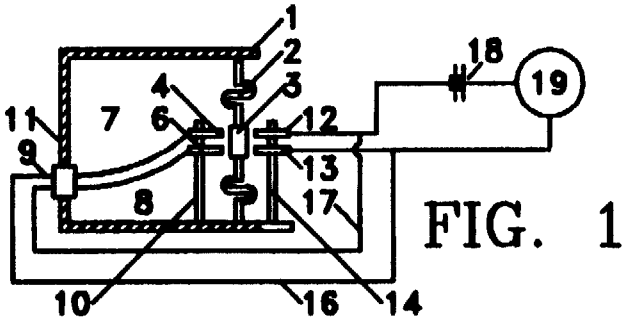
FIG. 1 is an illustration of a very simple arrangement within the scope of the present invention which has been found to operate satisfactorily to detect a selected occurrence.

FIG. 1 is an illustration of a simplified device illustrating one principle in accordance with the present invention. FIG. 1 is an illustration of a device to provide full wave detection of low frequency pressure waves. As previously stated it has been unexpectedly found that in the event of even the most minor occurrence in a space to be protected, a low frequency pressure wave is generated which can be detected indicating the occurrence.

In FIG. 1 a casing 1 is illustrated having a diaphragm 2 in the center of which is an electrical contact 3. It will be recognized that diaphragm 2 moves in response to the direct incidence of a pressure wave, the degree of movement depending upon the characteristics of diaphragm 2. Diaphragm 2 can be designed to respond to an extremely low pressure differential between the area outside the casing and the chamber defined by the casing. A barometric pressure equalizing aperture 11 is provided to equalize barometric pressure changes but small enough to permit measurement of relatively sudden pressure changes. A pair of contacts 4 and 6 are provided and carried by a post 10 within the chamber defined by casing 1 where connecting leads 7 and 8 are provided to extend through an insulator 9 in the rear wall of casing 1. In this form the detector device would provide half wave detection of a pressure wave. Also in accordance with the present invention, full wave detection can be provided by means of contacts 12 and 13 carried by post 14 outside of casing 1 where contact 3 moves between both contacts 4 and 6 and contacts 12 and 13 upon the incidence of a pressure wave to detect full wave occurrences. Connector 16 and 17 are connected to leads 7 and 8 and connected in series through a battery 18 and an alarm 19 for example, a bell.

It will be understood that where only positive or negative pressure is to be detected the appropriate set of contacts could be disconnected.

Figure 2:
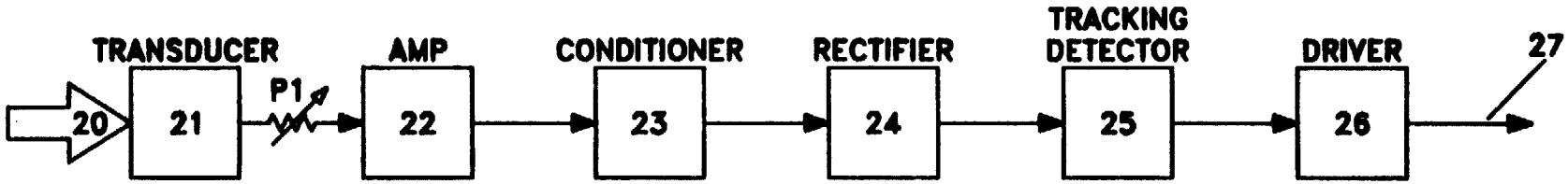
FIG. 2 is a flow diagram of a somewhat more complicated arrangement within the scope of the present invention.

FIG. 2 is a flow diagram of a simplified all electronic pressure detector. A transducer 21 is provided which may include any of a number of devices suited for this purpose such as, for example, a carbon pile, Piezo-electric, a semi-conductor strain gauge, a capacitance device, a reluctance device.

In the device shown in FIG. 2, a low frequency pressure wave 20 is received by transducer 21. A signal is fed to an amplifier 22 where sensitivity of the device is adjusted by means of a potentiometer P1. An output signal is supplied to a signal conditioner 23, as described hereinafter, to condition the signal to a useful form and the conditioned signal is provided to a rectifier 24 which then provides a rectified signal to tracking detector 25 which then provides an output signal to a driver 26 which provides an output signal 27 utilized to provide an alarm.

Figure 3:
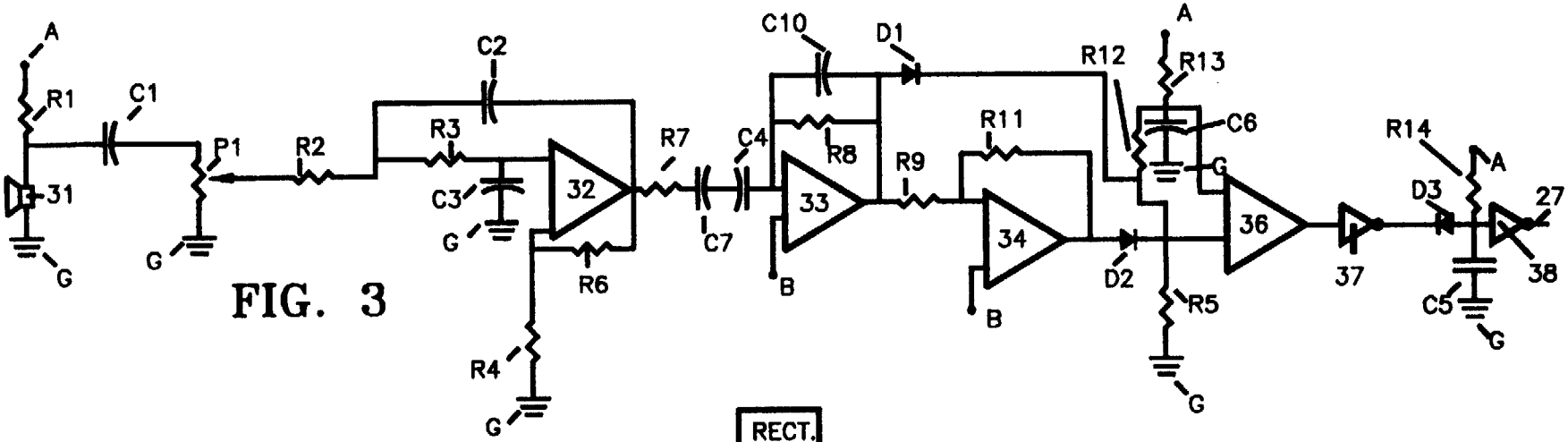
FIG. 3 is detailed schematic diagram of an example of one circuit within the scope of the present invention useful in the system of the type shown in FIG. 2.

One device in accordance with the arrangement of FIG. 2 is illustrated in FIG. 3 where a pressure transducer 31 is provided. A source of power A is supplied through resistor R1 to microphone 31 which is grounded at G. A coupling capacitor C1 is provided and the signal from capacitor C1 is provided to potentiometer P1 (as shown in FIG. 2) through a resistor R2 and R3 to the noninverting input of an operational amplifier 32 where a low pass filter R3-C3 to ground G is provided. A gain circuit including resistors R4 and R6 is provided to the inverting input of amplifier 32 along with a capacitor circuit including capacitor C2. The amplifier 32 and the associated circuitry including C1-P1, provides a band pass amplifier to pass selected signals, for example between 0.002 and 10 cycles per second. The output from amplifier 32 is coupled to the inverting input of a second amplifier 33 by means of a series coupling circuit including resistor R7 and capacitor C3–C4. A reference signal B is provided at the noninverting input of amplifier 33 and a capacitor C10 and resistor R8 are provided around amplifier 33 to provide a second low pass filter. The output from amplifier 33 is coupled through resistor R9 to the inverting input of a phase inverter 34 having a unity gain by means of resistors R9 and R11 to provide an output signal 180° out of phase with the output from amplifier 33. Full wave detection is accomplished by rectifying the in phase signal from amplifier 33 by diode D1 and the inverted other half of the signal (other phase) from amplifier 34 by diode D2. The combined outputs from amplifiers 33 and 34 are connected through Diodes D1–D2 to ground through resistor R5. Resistor R13 is provided to assure comparator amplifier 36 which is connected as a comparator is quiescent in the proper state. Resistor R12 and capacitor C6 are provided to delay the signal from diodes D1, D2 to the inverting input of comparator 36 so the device acts as a tracking detector. That is, the direct signal from amplifiers 33, 34 is provided through diodes D1, D2 to the noninverting input of comparator 36 and the comparator reference signal is delayed by means of the R12-C6 circuit so that slowly changing (noise, thermal or otherwise) signals do not actuate the device. Accordingly as the input to the noninverting input of comparator 36 rises slowly, the inverting input tracks the noninverting input except when a fast changing signal is received to trigger the comparator and turn on the output of comparator 36. Thus when comparator 36 is actuated, the output goes high and is supplied to an inverter 37 so that the output of inverter 37 goes low causing capacitor C5 to be discharged through diode D3. Discharging capacitor C5 causes the output 27 of inverter 38 to go high for a fixed minimum period of time (stretch) determined by the R14, C5 time constant to actuate the alarm device to indicate the presence of a low pressure wave, capacitor C5 being recharged through resistor R14 to supply voltage A.

Figure 4:
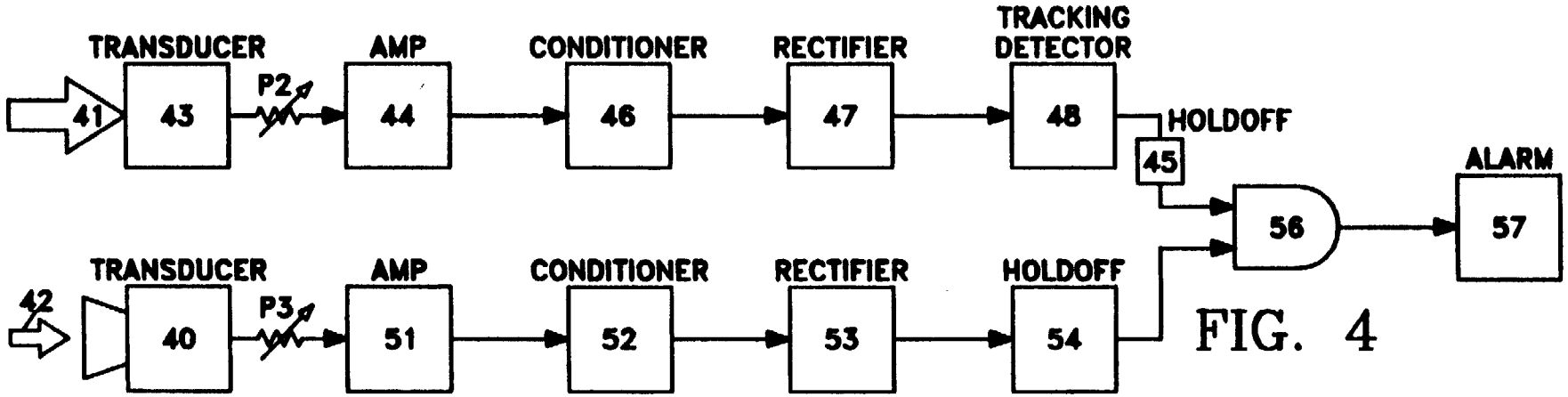
FIG. 4 is a flow diagram of a combined pressure sensitive and sonic sensitive device within the scope of the present invention.
Figure 5:
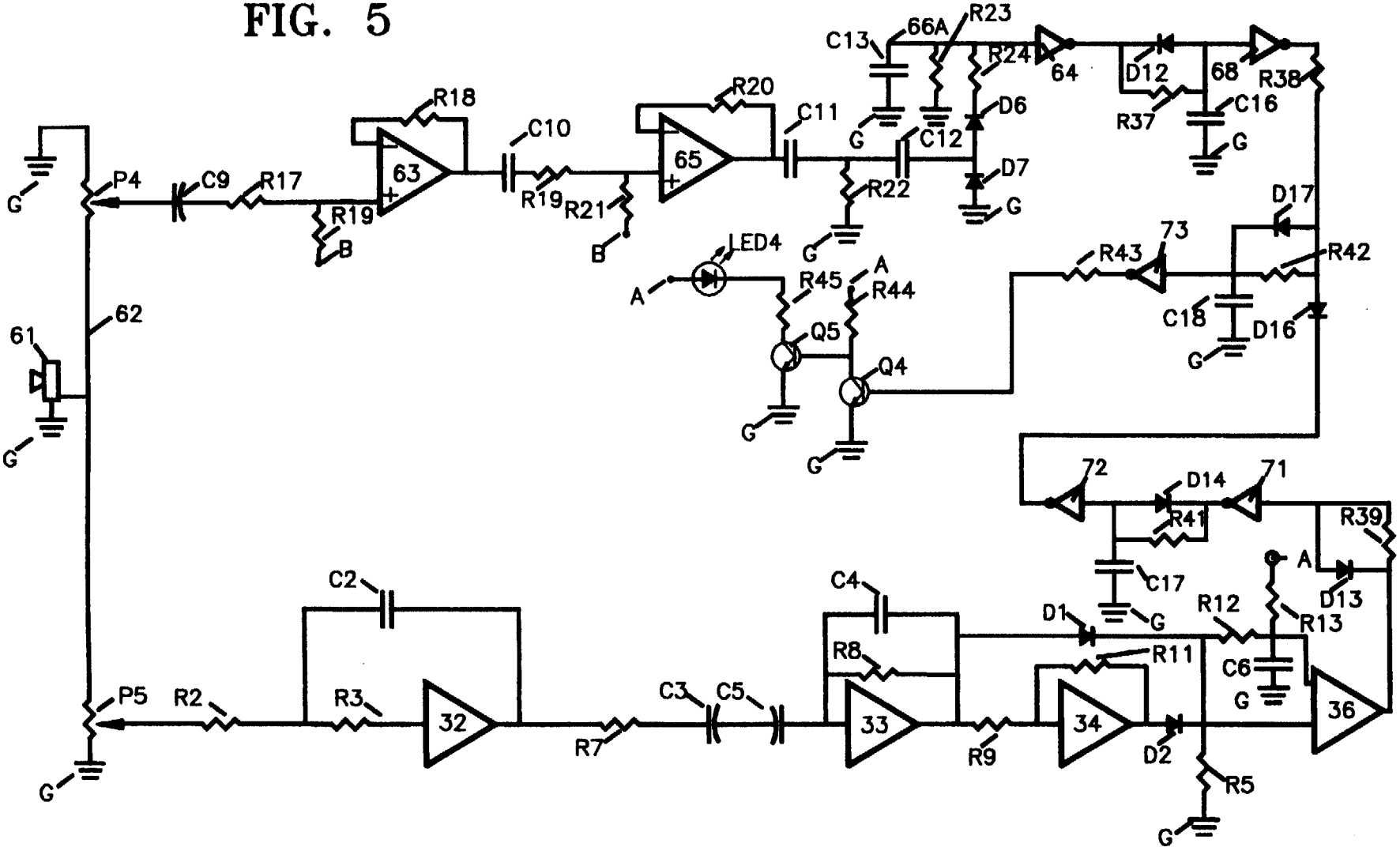
FIG. 5 is a detailed schematic of one circuit within the scope of the present invention useful in the system of the type shown in FIG. 4.

FIG. 4 is a flow chart of a combined pressure and sound activated device where the same pressure wave sensing arrangement as shown in FIG. 3 can be utilized including a pressure transducer connected through a sensitivity adjust potentiometer P2 to an amplifier 44 which supplies a signal to a signal conditioner 46 where the output of signal conditioner 46 is supplied to a full wave rectifier 47 and thence to a tracking comparator 48 and a holdoff 45 to an AND gate 56. In the sound detecting side of the arrangement a signal 42 is received by a transducer, for example a microphone 40, which supplies a signal to an amplifier 51 through sensitivity potentiometer P3. The output from amplifier 51 is supplied to a signal conditioner 52 which supplies a conditioned signal to rectifier 53 which supplies a rectified signal to a hold off 54 which likewise supplies a second signal to AND gate 56. Upon coincidence of the signals from holdoffs 45 and 54 AND gate 56 is actuated to activate an alarm 57. A schematic illustration of the arrangement shown in FIG. 4 is shown in FIG. 5.

Briefly, in addition to the pressure detector described in FIG. 3 a sound discriminator is used to reduce the incidence of false alarms and glass breakage detectors.

In operation the glass breakage detector responds to both the sound of the glass breaking and to the low frequency pressure wave generated when the window explodes into the room being protected. Holdoff and stretch circuits described hereinafter are used to insure the sound signal and the signal generated by the pressure wave are concurrent in the event of breakage of the window being protected. It has been found that the pressure wave travels slightly slower than the sound waves so provision must be made to both delay and stretch the signals so that in any reasonably sized area and at any reasonable distance, the signals will be coincident to trip the device. Accordingly, if a false trip would occur in a sound actuated device, for example, by a dog barking, or telephone bell, or lightning or other similar occurrence without the occurrence of the pressure wave, the device will not actuate. On the other hand, when glass breaks or other selected events occur; the simultaneous pressure wave and sound frequency will actuate the device. In FIG. 5 a pressure transducer 61 is provided with a sensitivity adjustment potentiometer P4. The output 62 from transducer 61 is coupled to a second potentiometer P5 which adjusts the level of the pressure signal to be received by the pressure detecting device. The pressure sensing circuit in FIG. 5 is a somewhat simplified version of that shown in FIG. 3 where the device shown in FIG. 5 bears similar numerals.

The signal to the sound sensing device is provided through potentiometer P4 where a sound discriminator device described hereinafter is shown to act as a band pass filter and detector to provide actuation in receipt of selected frequency signals. An example of one suitable type of frequency responsive detector is shown in FIG.

5 but it will be understood that within the scope of the present invention other similar devices may be found.

Referring to FIG. 5 for an illustration of a sound discriminator device which can be utilized within the scope of the present invention, transducer 61 is shown with the output 62 supplied through potentiometer P4 and a coupling capacitor C9 through resistor R17 to the noninverting input of a preamplifier 63. A reference voltage is provided from source B through resistor R19 and a gain circuit including resistor R18 is provided around amplifier 63. The output from amplifier 63 is coupled through a high pass filter C10-R19 to the noninverting input of an amplifier 65 supplied with a reference input B through resistor R21. A gain circuit is provided around amplifier 65 utilizing resistor R20. A high pass filter including capacitor C11 and resistor R22 is provided on the output from amplifier 65. A second high pass filter capacitor C12 resistors R23–R24 is provided to provide a signal to a rectifier circuit including diodes D6 and D7. A signal then results from the charge of capacitor C13 through resistor R24.

Because of the speed generally encountered in the occurrence of a sound such as breaking glass and the unexpectedly low rate of transmission of the low frequency pressure wave, it is necessary to delay the signal generated by the sound portion of the [occurance] *occurrence* so a signal extension circuit including diode D12, resistor R37, capacitor C16 to ground G is provided to stretch the signal, for example for approximately 40 milliseconds. The signal from inverter 68 is supplied through a resistor R38 which forms part of an AND gate as described hereinafter.

The signal provided by tracking detector 36 is supplied to a holdoff circuit consisting of a diode D13 and a resistor R39 and inverter 71 where the output from inverter 71 passes through a second "stretch out" circuit diode D14 Resistor R41 and capacitor C17 to ground G to a second inverter 72. The output from inverter 72 is supplied by means of a diode D16 which, with resistor R38, provides an AND gate. So long as there is no alarm from sound or pressure the output from inverters 68, 72 is low. An AND gate composed of resistor R38, diode D16 operates as follows: Assuming inverter 72 is low diode D16 will shunt any output from inverter 68 to ground through resistor R38. [Conversly] *Conversely* if the output of inverter 72 is high, diode D16 is reversed biased if the output of inverter 68 is low and in these two instances the anode of diode D17 remains low and there is no output. Upon the occurrence of a pressure wave the output from inverter 72 goes high for a short period determined by the "stretch out" circuit D14-R41-C17. In the event of a sound occurrence output of inverter 68 goes high. The coincidence of the high signals causes diode D17 to conduct charging C17 through resistor R38. Diode D17 resistor R42 and capacitor C18 comprise another stretch circuit which determines the minimum duration of the alarm output. The signal is supplied to an inverter 73 where the output from inverter 73 is supplied through a resistor R43 to the base of a transistor Q4 where the emitter is grounded and the collector is connected to supply voltage A by means of resistor R44. Transistor Q4 is normally conductive but upon the occurrence of a simultaneous pressure and sound signal inverter 73 goes low so that transistor Q4 goes nonconductive and the collector of transistor Q4 is supplied to the base of transistor Q5 which goes conductive activating a LED 4 to indicate an alarm.

Figure 6:
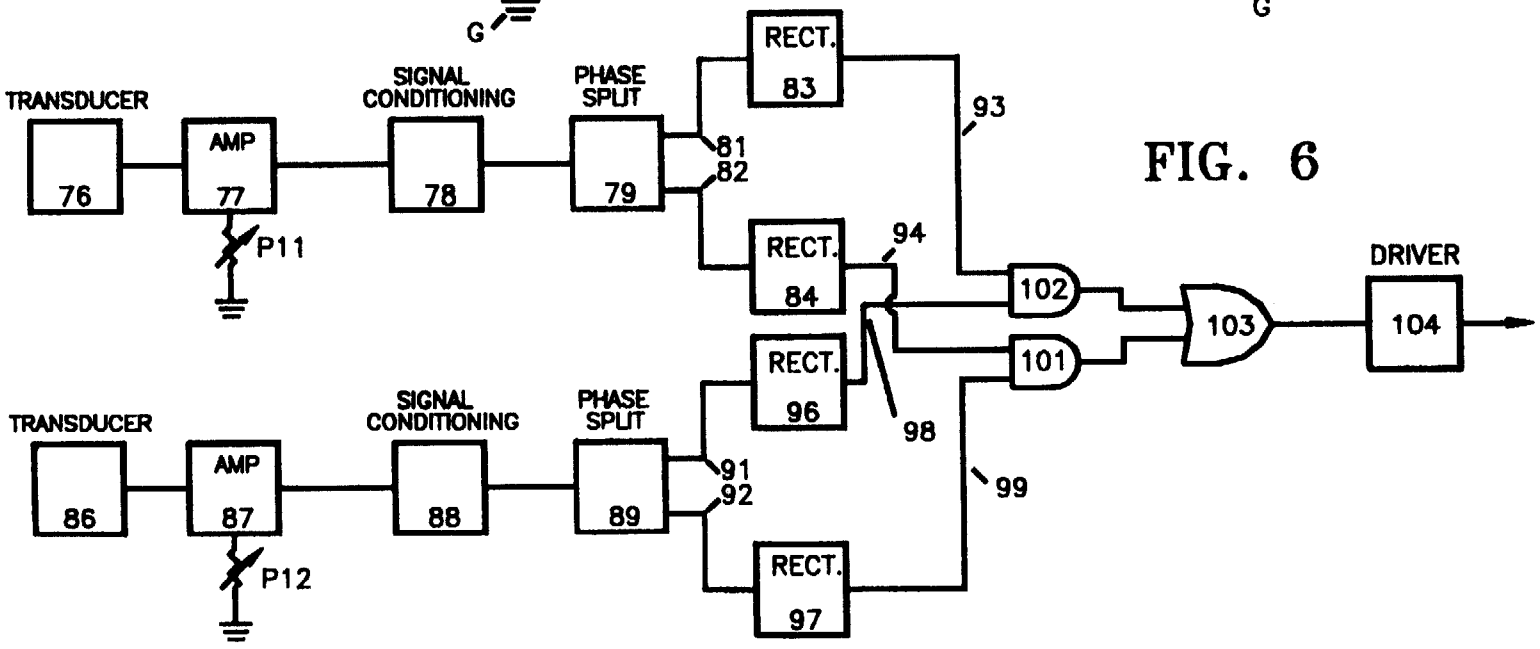
FIG. 6 is a flow diagram of a dual pressure sensing device within the scope of the present invention.

FIG. 6 illustrates another utilization of pressure detectors within the scope of the present invention and in this configuration two separate detectors are connected in an anti-coincidence mode. Devices of the sort described herein are useful where pressure events normally occur in the space to be monitored, for example the activation of heating, ventilating, air conditioning equipment, thunderclaps or other occurrences where it is desired to compare the pressure waves in the area to be protected with a reference area so that simultaneous generation of in phase pressure waves prevents false tripping of the alarm system. In the arrangement shown, a remote transducer 76 is located, for example on one side of the wall outside the area to be protected. A master detector 86 is located in the area to be protected. The phase of the pressure signals are split and the phases are "anded" so that in order to get an output from the master device the remote device must generate a signal that is out of phase with the output of the detector in the area to be protected. It has been found that this procedure minimizes the occurrences false alarms due to common mode changes.

A flow chart of the arrangement is shown in FIG. 6 where the remote located transducer 76 is shown connected to an amplifier 77 with the sensitivity adjusted by a potentiometer P11. The output from amplifier 77 is supplied to a signal conditioning device 78 which supplies a signal to a phase splitter 79 which provides outputs 81–82 to positive and negative rectifiers 83 and 84 each of which provides a signal 93–94. In the master detector which is located in the area to be observed, transducer 86, is located to supply a signal to an amplifier 87 with sensitivity adjusted by potentiometer P12. The output from amplifier 87 is supplied through conditioning circuit 88 to a phase splitter 89 which supplies signals 91–92 to rectifiers 96–97 which supply signals 98–99 respectively to the AND gates 101 and 102 along with signals 93 and 94 from phase splitters 83 and 84. The outputs of the AND gates 101 and 102 are supplied to an OR gate 103 to activate a driver 104 to activate the alarm device.

Figure 7:
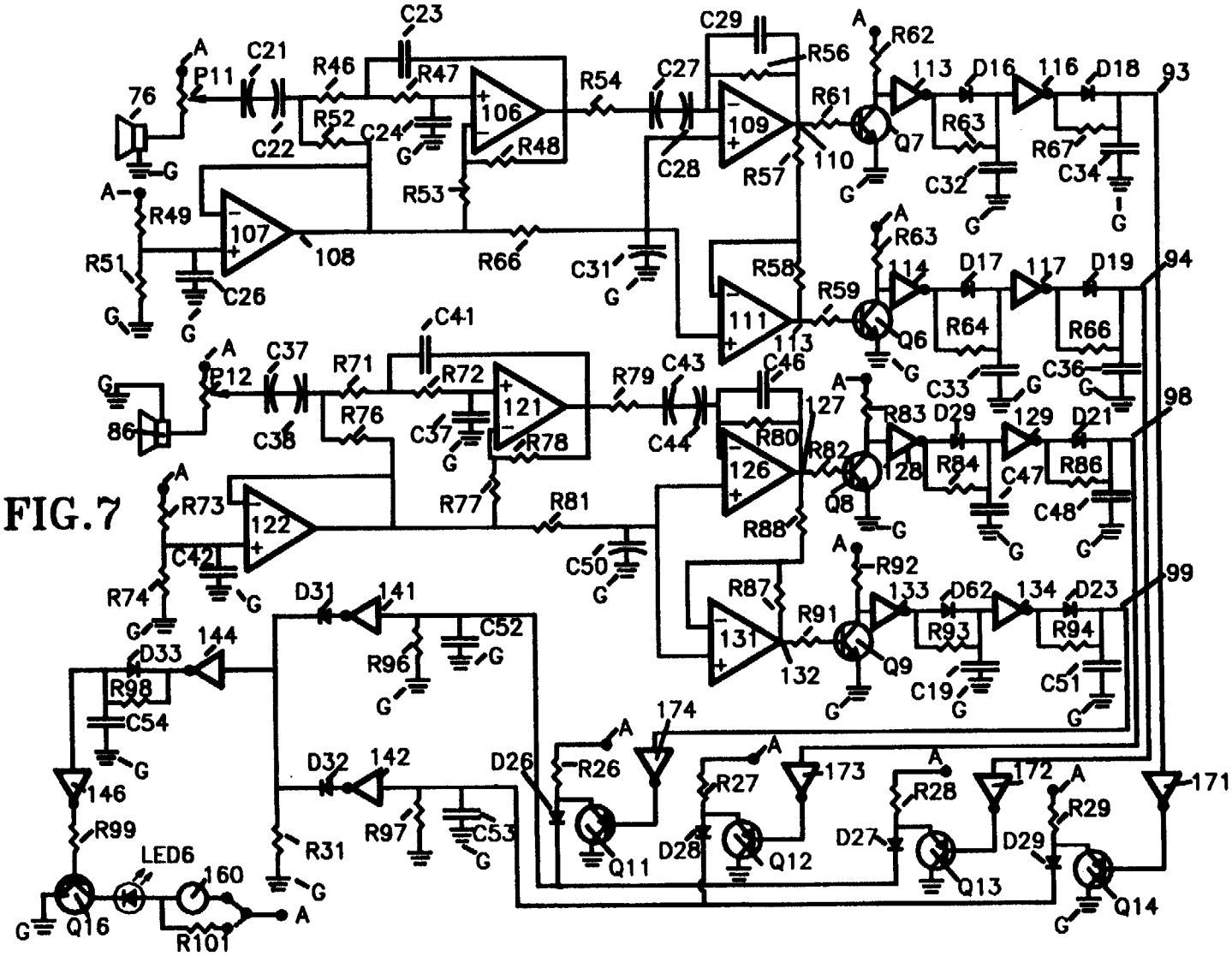
FIG. 7 is a detailed schematic diagram of an example of one circuit within the scope of the present invention useful in a system of the type shown in FIG. 6.

A schematic illustration of a circuit to accomplish the objective shown in FIG. 6 is illustrated in FIG. 7 where transducers 76,86 are shown connected to potentiometers P11 and 12. The output from potentiometer P11 is connected through Pdecoupling capacitors C21–C22 and through resistor R46 to a band pass amplifier 106 which is provided with gain circuit including resistors R48 and R53. A low pass filter resistor R47, capacitor C24 connected to G is provided to the noninverting input of the amplifier. The high pass function of amplifier 106 is provided by capacitor C23. The inverting input to amplifier 106 is supplied from a reference source including a unity gain operational amplifier 107 having a noninverting input from supply voltage A through a voltage divider including resistors R49–R51 and filtered by capacitor C26. The inverting input to op amp 107 is provided from its output. The output 108 from amplifier 107 is supplied through a resistor R53 to the inverting input of operational amplifier 106 and to the noninverting input of amplifier 106 through R52, R46 and R47. The output from amplifier 106 is supplied through a resistor R54 and decoupling capacitors C27–C28 to the inverting input of an operational amplifier 109 to provide an output 110 which is of a first phase. A gain circuit including resistor R56, and a low pass determining capacitor C29 is provided for amplifier 109. Within the scope of the present invention an inverted phase is provided by means of a second operational amplifier 111 where the inverting input to amplifier 111 is provided from amplifier 109 and the noninverting input to amplifier 111 is provided by output 108 of the reference generator amplifier 107 and filtered by capacitor C31 and resistor R66. Resistors R57–R58 are provided in series between the outputs 110 and 113 and are chosen to cause amplifier 111 to have unity gain. Output 113 is provided through resistor R59 to the base of a transistor Q6. The output 110 is likewise provided through a resistor R61 to the base of a transistor Q7. Each of the transistors Q6–Q7 transmits the occurrence of a pressure signal of different phase. The collector of transistor Q7 is connected through an inverter 113 to a holdoff circuit including a diode D16, resistor R63, capacitor C32 to an inverter 116 which supplies an output signal to a "stretch out" circuit including diode D18, resistor R67 and capacitor C34 to provide signal 93 as shown in FIG. 7.

Likewise, transistor Q6 has its collector connected to an inverter 114 where the output is connected to a holdoff circuit including diode D17, resistor R64, and capacitor C33 and to inverter 117 which supplies a "stretch out" circuit comprising diode D19, resistor R66 and capacitor C36 so that signal 94 is provided as shown in FIG. 7.

The transducer 86 located in the area to be monitored is connected through potentiometer P12 and decoupling capacitors 37–38 and resistor R71–R72 to a band pass amplifier 121 which is provided with gain circuit including resistors R77, R78. Capacitor C41 is used to form a high-pass filter. A low pass filter resistor R72, capacitor C37 connected to G is provided to the noninverting input of amplifier 121. The inverting input to amplifier 121 is supplied from a reference source including a unity gain operational amplifier 122 having a noninverting input from supply voltage A through a voltage diver including resistors R73–R74 and filtered by capacitor C42. The inverting input to op amp 122 is provided from its output 123. Output 123 from amplifier 122 is supplied through a resistor R77 to the inverting input of operational amplifier 121 and to the noninverting input of amplifier 121 through resistors R76, R71 and R72. The output from amplifier 121 is supplied through a resistor R79 and decoupling capacitors C43–C44 to the inverting input of an operational amplifier 126 to provide an output 127 which is of a first phase. A gain circuit including resistor R81, and a low pass determining capacitor C46 is provided for amplifier 126. Within the scope of the present invention an inverted phase is provided by means of a second operational amplifier 131 where the inverting input to amplifier 131 is provided from amplifier 126 and the noninverting input to amplifier 131 is provided by output 123 of the reference generator amplifier 122 and filtered by capacitor C50 and resistors R80. Resistors R87–R88 are provided in series between the outputs 127 and 132 and are chosen to cause amplifier 131 to have unity gain. Output 132 is provided through resistor R91 to the base of a transistor Q9. The output 127 is likewise provided through a resistor R82 to the base of a transistor Q8. Each of the transistors Q8–Q9 transmits the occurrence of a pressure signal of different phase. The collector of transistor Q8 is connected through an inverter 128 to a holdoff circuit including a diode D29, resistor R84, capacitor C47 to an inverter 129 which supplies an output signal to a "stretch out" circuit including diode D21, resistor R86 and capacitor C48 to provide signal 98 as shown in FIG. 7.

Likewise transistor Q9 has its collector connected to an inverter 133 where the output is connected to a holdoff circuit including diode D62, resistor R93, and capacitor C19 and to inverter 134 which supplies a "stretch out" circuit comprising diode D23, resistor R94 and capacitor C51 so that signal 99 is provided as shown in FIG. 7.

The signals 93–94 and 98–99 are then provided through inverters 171–174 to transistors Q14, Q13, Q12 and Q11. The outputs from transistors Q12 and Q14 are combined through diodes D28 and D29 to provide an output 121. One of the AND gates, for example AND gate 102, of FIG. 6 is provided by diodes D28,D29. For example, when both transistors Q14 and Q12 go conductive, diodes D29 and D28 are reverse biased, allowing capacitor C53 to be discharged through resistor R97 causing the output of inverter 142 to go high. Output 121 is supplied through a circuit including capacitors C53, resistor R97 to an inverter 142 and a diode D32. Output 122 is provided through a delay circuit including resistor R96 and capacitor C52 to an inverter 141 and a diode D31. The combination of Diodes D31–D32 provides the OR gates of FIG. 7. Thus upon the occurrence of a signal in either output 121 or output 122 inverter 144 goes low through a "stretch out" circuit including diode D32, resistor R98 and capacitor C54 to an inverter 146 and a resistor R99 to activate a transistor Q16 which goes conductive and activates an alarm 160 and light emitting diode LED 6. A double pole switch 161 is provided to operate from position shown in FIG. 7 to permit operation of the audible alarm to a second position shown by dotted line where only the LED 6 is activated.

The invention claimed is:

1. A signalling device to detect coincidence of first and second selected conditions in a selected area [where] *wherein* the first selected condition is infrasonic air pressure waves having frequencies below 20 cycles per second and the second selected condition is selected sonic frequency waves, said device comprising;

a pressure sensitive transducer means responsive to said infrasonic air pressure waves to provide an alternating electrical signal;

an amplifier means to selectively amplify said alternating electrical signal to provide an amplified alternating output signal;

a rectifier means to rectify said amplified alternating output signal to provide a first *rectified* signal;

a sonic frequency transducer means responsive to selected frequencies to provide a second alternating electrical signal;

a second amplifier means to selectively amplify said second alternating electrical signal to provide a second amplified alternating output signal;

a second rectifier means to rectify said second amplified alternating output signal to provide a second rectified signal;

a switch means, including a coincidence detector responsive to the first and second rectified signals, which activates an alarm in response to coincident receipt of the first and second rectified signals.

2. A signalling device according to claim 1 including [first] delay means to delay transmission of said first

*rectified* signal to said switch means for a selected period of time.

3. A signalling device according to claim 1 including [second] delay means to delay transmission of said second *rectified* signal to said switch means for a selected period of time.

*4. A signalling device according to claim 1, including a stretch means to cause said first rectified signal to have an increased pulse duration, wherein said switch means activates said alarm during any coincident receipt of said second rectified signal and said first rectified signal having said increased pulse duration.*

*5. A signalling device according to claim 4, including a second stretch means to cause said second rectified signal to have a second increased pulse duration, wherein said switch means activates said alarm during any coincident receipt of said first rectified signal having first-recited increased pulse duration and said second rectified signal having said second increased pulse duration.*

*6. A signalling device according to claim 1, including a stretch means to cause said second rectified signal to have an increased pulse duration, wherein said switch means activates said alarm during any coincident receipt of said firsts rectified signal and said second rectified signal having said increased pulse duration.*

*7. A signalling device according to claim 2, including a second delay means to delay transmission of said second rectified signal to said switch means for a second selected period of time.*

*8. A signalling device according to claim 7, wherein said second selected period of time is greater than said first-recited selected period of time.*

*9. A signalling device according to claim 8, including a stretch means to cause said first rectified signal to have an increased pulse duration, wherein said switch means activates said alarm during any coincident receipt of said second rectified signal and said first rectified signal having said increased pulse duration.*

*10. A signalling device according to claim 9, including a second stretch means to cause said second rectified signal to have a second increased pulse duration, wherein said switch means activates said alarm during any coincident receipt of said first rectified signal having said first-recited increased pulse duration and said second rectified signal having said second increased pulse duration.*

*11. A signalling device according to claim 8, including a stretch means to cause said second rectified signal to have an increased pulse duration, wherein said switch means activates said alarm during any coincident receipt of said second rectified signal and said second rectified signal having said increased pulse duration.*

*12. A signalling device according to claim 7, including a stretch means to cause said first rectified signal to have an increased pulse duration, wherein said switch means activates said alarm during any coincident receipt of said second rectified signal and said first rectified signal having said increased pulse duration.*

*13. A signalling device according to claim 12, including a second stretch means to cause said second rectified signal to have a second increased pulse duration, wherein said switch means activates said alarm during any coincident receipt of said first rectified signal having said first-recited increased pulse duration and said second rectified signal having said second increased pulse duration.*

*14. A signalling device according to claim 7, including a stretch means to cause said second rectified signal to have an increased pulse duration, wherein said switch means activates said alarm during any coincident receipt of said first rectified signal and said second rectified signal having said increased pulse duration.*

*15. A signalling device according to claim 2, including a stretch means to cause said first rectified signal to have an increased pulse duration, wherein said switch means activates said alarm during any coincident receipt of said second rectified signal and said first rectified signal having said increased pulse duration.*

*16. A signalling device according to claim 15, including a second stretch means to cause said second rectified signal to have a second increased pulse duration, wherein said switch means activates said alarm during any coincident receipt of said first rectified signal having said first-recited increased pulse duration and said second rectified signal having said second increased pulse duration.*

*17. A signalling device according to claim 2, including a stretch means to cause said second rectified signal to have an increased pulse duration, wherein said switch means activates said alarm during any coincident receipt of said first rectified signal and said second rectified signal having said increased pulse duration.*

*18. A signalling device according to claim 3, including a stretch means to cause said first rectified signal to have an increased pulse duration, wherein said switch means activates said alarm during any coincident receipt of said second rectified signal and said first rectified signal having said increased pulse duration.*

*19. A signalling device according to claim 18, including a second stretch means to cause said second rectified signal to have a second increased pulse duration, wherein said switch means activates said alarm during any coincident receipt of said first rectified signal having first-recited increased pulse duration and said second rectified signal having said second increased pulse duration.*

*20. A signalling device according to claim 3, including a stretch means to cause said second rectified signal to have an increased pulse duration, wherein said switch means activates said alarm during any coincident receipt of said first rectified signal and said second rectified signal having said increased pulse duration.*

* * * * *